3,067,204
Patented Dec. 4, 1962

3,067,204
2,2-DIMETHYL-6-PHENYLPIPERIDINE DERIVATIVES
Charon Robin Ganellin, Clapton, London, and Robert Geoffrey William Spickett, Harpenden, England, assignors to Smith Kline & French Laboratories Limited, Hertfordshire, England, a corporation of Great Britain
No Drawing. Filed Sept. 2, 1960, Ser. No. 53,628
Claims priority, application Great Britain Sept. 16, 1959
9 Claims. (Cl. 260—294.7)

This invention relates to new 2,2-dimethyl-6-phenylpiperidine derivatives having valuable pharmacodynamic activity.

More specifically the compounds of this invention alter or modify the central nervous system. The compounds have anti-amphetamine activity and yet are central nervous stimulants producing increased motor activity. In addition these compounds are blockers of conditioned response. Thus, the compounds of this invention have a unique combination of central nervous system activities and are useful in the animal organism as ataractic, antidepressant and mild tranquilizing agents.

The new 2,2-dimethyl-6-phenylpiperidine derivatives of this invention are represented by the following structural formula:

FORMULA I

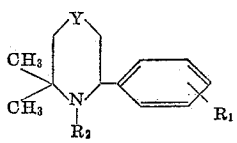

when:

Y represents

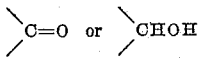

$R_1$ represents halogen or trifluoromethyl and
$R_2$ represents hydrogen or lower alkyl.

Preferred compounds of this invention are those in which Y is carbonyl, $R_1$ is halogen, advantageously chloro, and $R_2$ is hydrogen.

A particularly advantageous and useful compound is 2,2-dimethyl-6-(p-chlorophenyl)-4-piperidone.

We have unexpectedly found that the compounds of Formula I particularly those in which $R_1$ is in the para position and Y is carbonyl have pronounced anti-amphetamine and conditioned response blocking activities while the known unsubstituted parent compounds (Beilstein, 21,299) are practically inactive.

By the term "halogen" where used herein chloro, bromo or fluoro groups are indicated. The term "lower alkyl" where used herein denotes groups having 1–4 carbon atoms, preferably methyl.

This invention also includes pharmaceutically acceptable salts of the above defined bases formed with nontoxic organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Examplary of such organic salts are those with maleic, fumaric, ascorbic, succinic, methanesulfonic, ethanedisulfonic, tartaric, salicylic, citric, lactic, malic, benzene sulfonic and theophylline acetic acids as well as with the 8-halotheophyllines, for example, 8-bromotheophylline. Exemplary of such inorganic salts are those with hydrochloric, hydrobromic, sulfuric, phosphoric and nitric acids. Of course, these salts may also be prepared by the classical method of double decomposition of appropriate salts which is well-known to the art.

The piperidones of this invention are prepared by reacting a salt of diacetonamine with an aromatic aldehyde as follows:

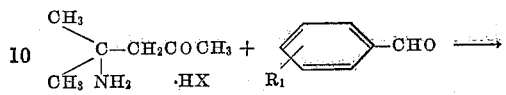

The term $R_1$ is as previously defined; the term HX denotes a suitable organic or inorganic acid such as, for example, oxalic, acetic, maleic, hydrochloric or hydrobromic acid.

The reaction is preferably carried out with an excess, advantageously about two molar equivalents, of the diacetonamine salt in a lower alcohol solvent such as ethanol, methanol or isopropanol at elevated temperatures, conveniently at the reflux temperature of the solvent.

Piperidones having an N-lower alkyl substituent are prepared by reacting the corresponding N-unsubstituted compounds with an alkylating agent such as a lower alkyl halide or sulfate. The alkylation is advantageously carried out in the presence of an excess of an acid binding agent such as an alkali metal carbonate preferably sodium or potassium carbonate and in an inert organic solvent such as benzene or toluene.

The piperidinols of this invention are prepared by reducing the corresponding piperidones with an appropriate reducing agent such as an alkali metal borohydride, for example sodium, potassium or lithium borohydride. The reaction is preferably carried out in an aqueous lower alcohol solvent such as methanol or ethanol at a reaction temperature of about 25–35° C.

The following examples are not limiting but are illustrative of the compounds of this invention and will serve to make fully apparent all of the compounds embraced by the general formula given above.

EXAMPLE 1

Preparation of 2,2-Dimethyl-6-(p-Chlorophenyl)-4-Piperidone

A hot, filtered solution of 115.5 g. of diacetonamine hydrogen oxalate in 600 ml. of ethanol is treated with 70 g. of p-chlorobenzaldehyde, and the mixture is refluxed for five hours and then filtered. The filtrate is refluxed for a further 24 hours, being filtered at intervals, and the combined solid products are shaken with 10% sodium carbonate for one hour and then extracted with chloroform. Evaporation of the chloroform and crystallization of the residue gives 2,2-dimethyl-6-(p-chlorophenyl)-4-piperidone as white crystals, M.P. 69.5–70° C. The hydrochloride, prepared in ether, has a melting point of 178° C. (decomposition).

EXAMPLE 2

Preparation of 2,2-Dimethyl-6-(o-Chlorophenyl)-4-Piperidone

The reaction is carried out in the manner described in Example 1, using o-chlorobenzaldehyde as the aromatic aldehyde. The product has a melting point of 65.5–66.5° C. The hydrochloride melts at 170.5-171° C. (decomposition).

EXAMPLE 3

*Preparation of 2,2-Dimethyl-6-(p-Fluorophenyl)-4-Piperidone*

The reaction is carried out in a manner similar to that described in Example 1, the p-chlorobenzaldehyde being replaced by p-fluorobenzaldehyde. The product is an oil (B.P. 120° C. at 0.7 mm.) which solidifies on standing. The solid product is crystallized from light petroleum (B.P. 0° C.) to give colorless prisms, M.P. 48–48.5° C. Its hydrochloride melts at 171° C. (decomposition).

EXAMPLE 4

*Preparation of 2,2-Dimethyl-6-(m-Chlorophenyl)-4-Piperidone*

The reaction is carried out in a manner similar to that described in Example 1, the p-chlorobenzaldehyde being replaced by m-chlorobenzaldehyde. The product is a pale yellow viscous oil (B.P. 135° C. at 0.2 mm.) which gives a crystalline hydrochloride, M.P. 166.5–167 C. (decomposition).

EXAMPLE 5

*Preparation of 2,2-Dimethyl-6-(p-Chlorophenyl)-1-Methyl-4-Piperidone*

A solution of 47.7 g. of 2,2-diemthyl-6-(p-chlorophenyl)-4-piperdione (prepared in the manner described in Example 1) in 200 ml. of benzene is treated with 22.4 g. of sodium carbonate and then with 26.4 g. of dimethyl sulfate. The mixture is refluxed for one hour, then filtered, and the resulting filtrate is extracted three times with dilute hydrochloric acid. The acid solution is treated with sodium hydroxide to precipitate 2,2-dimethyl-6-(p-chlorophenyl)-1-methyl-4 - piperidone, M.P. 116.5–117.5° C.

EXAMPLE 6

*Preparation of 2,2-Dimethyl-6-(p-Chlorophenyl)-4-Piperidinol*

A solution of sodium borohydride (2.31 g.) in water (10 cc.) is added to a stirred solution of 2,2-dimethyl-6-(p-chlorophenyl)-4-piperidone (50 g.) in methanol (200 cc.) with cooling to keep the temperature below 35° C. The mixture is stirred for a further 30 minutes and water (200 cc.) is added. The mixture is extracted with ether and the ether extract is dried and evaporated. The residue is distilled to give the desired 4-piperidinol B.P. 180° C. (0.03 mm.), M.P. 94.5° C. after crystallization from light petroleum (B.P. 40–60° C.). Its hydrochloride melts at 305° C. (decomposition).

EXAMPLE 7

*Preparation of 2,2-Dimethyl-6-(p-Bromophenyl)-4-Piperidone*

The reaction is carried out in a manner similar to that described in Example 1, the p-chlorobenzaldehyde being replaced by p-bromobenzaldehyde. The product is a colorless crystalline solid M.P. 70–71° C. after crystallization from light petroleum (P.B. 40–60° C.). Its hydrochloride melts at 164° C. (decomposition).

EXAMPLE 8

*Preparation of 2,2-Dimethyl-6-(m-Trifluoromethylphenyl-4-Piperidone*

The reaction is carried out in a manner similar to that described in Example 1, the p-chlorobenzaldehyde being replaced by m-trifluoromethylbenzaldehyde. The product is isolated and purified as its hydrochloride, M.P. 182.5–183.5° C. (decomposition) after crystallization from a mixture of methyl ethyl ketone and ether.

EXAMPLE 9

*Preparation of 2,2-Dimethyl-6-(p-Bromophenyl)-1-Butyl-4-Piperidone*

A mixture of 28.2 g. of 2,2-dimethyl-6-(p-bromophenyl)-4-piperidone, prepared as in Example 7, 13.7 g. of n-butyl bromide, 10.6 g. of sodium carbonate and 100 cc. of benzene is refluxed for 90 minutes, then filtered and extracted with dilute hydrochloride acid. Treatment of the acid extracts with sodium hydroxide solution gives 2,2-dimethyl-6-(p-bromophenyl)-1-butyl-4-piperidone.

An ether solution of this piperidone is treated with hydrogen chloride to yield the hydrochloride salt.

EXAMPLE 10

*Preparation of 2,2-Dimethyl-6-(p-Chlorophenyl)-1-Methyl-4-Piperidinol*

Sodium borohydride (1.2 g.) in water (5 cc.) is added with stirring to a methanol solution of 26.0 g. of 2,2-dimethyl-6-(p-chlorophenyl)-1-methyl - 4 - piperidone, made as in Example 5, keeping the temperature below 35° C. The mixture is stirred for 30 minutes, diluted with water and extracted with ether. The ether extracts are dried evaporated and distilled to give the desired piperidinol.

Treating an ether solution of the free base with excess glacial acetic acid gives the acetate salt.

EXAMPLE 11

*Preparation of 2,2-Dimethyl-6-(p-Trifluoromethylphenyl)-4-Piperidone*

The reaction is carried out in a manner similar to that described in Example 1, the p-chlorobenzaldehyde being replaced by p-trifluoromethylbenzaldehyde to give, after recrystallization from methyl ethyl ketone and ether, the desired product.

A solution of the free base in ether is treated with excess maleic acid to give the maleate salt.

EXAMPLE 12

*Preparation of 2,2-Dimethyl-6-(p-Trifluoromethylphenyl)-4-Piperidinol*

A mixture of 2.3 g. of sodium borohydride in 10 cc. of water is stirred with 56.0 g. of 2,2-dimethyl-6-(p-trifluoromethylphenyl-4-piperidone, prepared as in Example 11, in methanol as in Example 6 to give the desired 4-piperidinol.

The free base in ethanol is treated with an excess of ethereal hydrogen bromide to separate the hydrobromide salt.

What is claimed is:
1. A chemical compound having the formula:

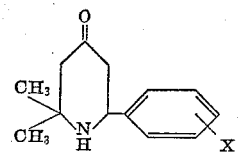

in which X is halogen.

2. A chemical compound having the formula:

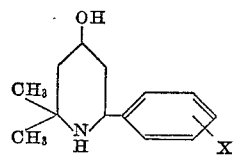

in which X is halogen.

3. 2,2-dimethyl-6-(p-chlorophenyl)-4-piperidone.
4. 2,2-dimethyl-6 - (p-chlorophenyl) - 4-piperidone hydrochloride.
5. 2,2-dimethyl-6 - (p-trifluoromethyphenyl) - 4-piperidone.
6. 2,2-dimethyl-6-(p-fluorophenyl)-4-piperidone.
7. 2,2-dimethyl-6 - (p-chlorophenyl) - 4-piperidinol hydrochloride.

8. 2,2-dimethyl-6 - (p-trifluoromethylphenyl) - 4-piperidinol.

9. 2,2-dimethyl-6 - (m-trifluoromethylphenyl)-4-piperidone.

References Cited in the file of this patent

UNITED STATES PATENTS

| | | |
|---|---|---|
| 2,894,948 | De Stevens et al. | July 14, 1959 |
| 2,945,032 | Marxer | July 12, 1960 |

OTHER REFERENCES

Fischer: Deutsche Chemische Gesellschaft (Berichte), vol. 16: page 2238 (1883).

Fischer: Deutsche Chemische Gesellschaft (Berichte), vol. 17: page 1798 (1884).

Anker et al.: Journal of the Chemical Society, (1945): pages 919 and 920.

Yale: Journal of Medicinal and Pharmaceutical Chemistry, vol. 1 [No. 2]: page 121 (1959).